United States Patent Office 3,585,247
Patented June 15, 1971

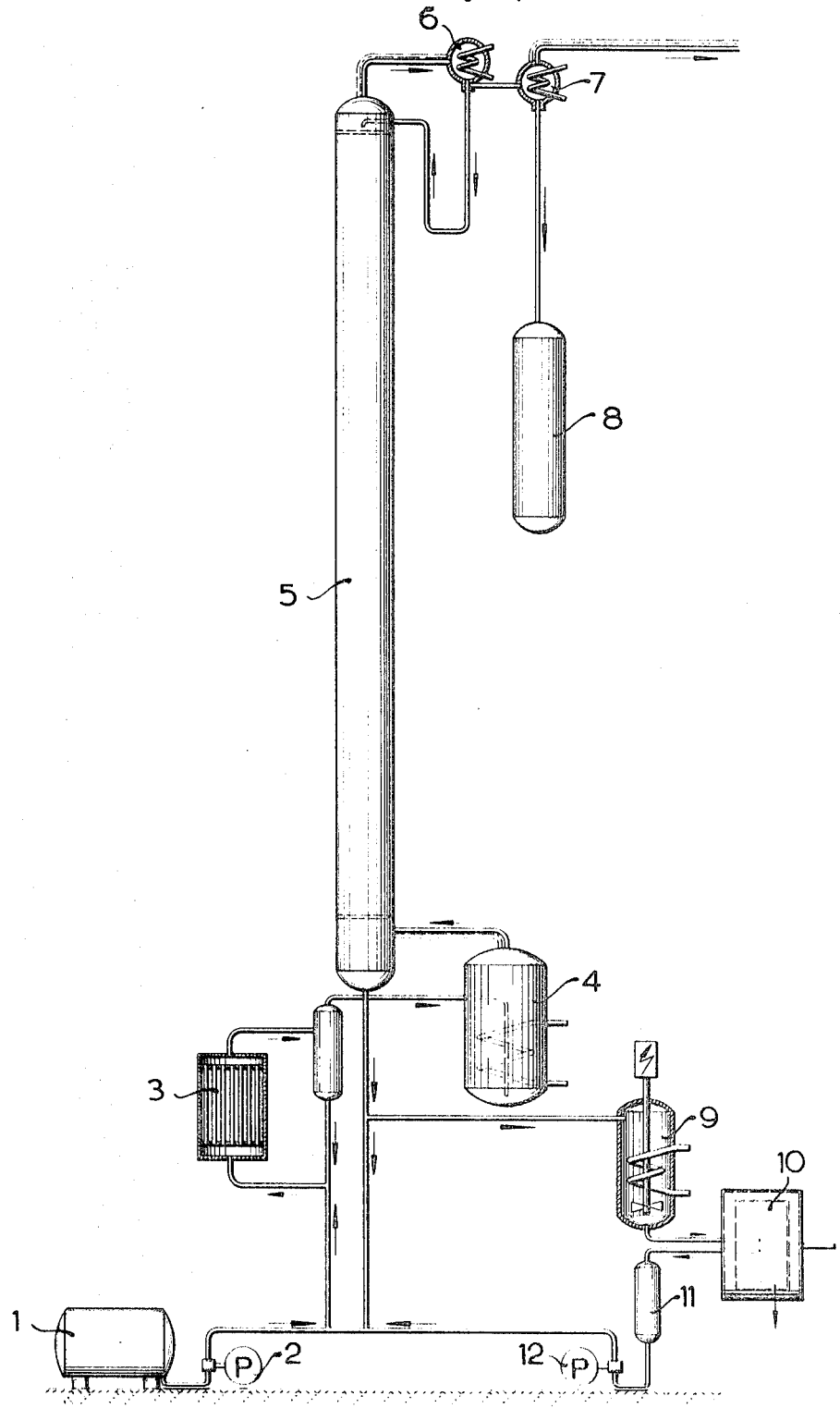

3,585,247
PROCESS FOR THE MANUFACTURE OF A MIXTURE CONSISTING SUBSTANTIALLY OF 1,2-DICHLOROBUTENE-(2), 1,3-DICHLOROBUTENE-(2) AND 2,3-DICHLOROBUTENE-(1)
Kurt Sennewald and Klaus Gehrmann, Knapsack, near Cologne, and Günter Viertel, Bruhl, Germany, assignors to Knapsack Aktiengesellschaft, Knapsack, near Cologne, Germany
Filed July 30, 1968, Ser. No. 748,784
Claims priority, application Germany, Aug. 17, 1967, P 12 71 107.8-42
Int. Cl. C07c 21/04
U.S. Cl. 260—654
2 Claims

ABSTRACT OF THE DISCLOSURE

Improvement in or modification of the process described in copending application Ser. No. 587,434, now U.S. Pat. No. 3,413,365 comprising withdrawing resulting dichlorobutene mixture at a reflux ratio of $R=1$ to 20; withdrawing the completely condensed matter or reflux matter near the column base; introducing such matter into a circulation evaporator and recycling it later in vapor form from said evaporator into the reactor; continuously supplying the said circulation evaporator with metered quantities of fresh tetrachlorobutane-containing 1,2,3-trichlorobutane coming from a reservoir, the said tetrachlorobutane-containing 1,2,3-trichlorobutane being supplied at the same rate as produced dichlorobutene mixture is withdrawn from the column; and, once the 1,2,3-trichlorobutane in the reactor is found to contain about 30% by weight tetrachlorobutane, introducing a portion of the reflux matter withdrawn near the column base into a stirrable cooler; centrifuging the 2,2,3,3-tetrachlorobutane, which is found partially to crystallize in the said cooler at a temperature of 0° C., and withdrawing it; and recycling mother liquor to the said circulation evaporator.

In copending application Ser. No. 587,434, now U.S. Pat. 3,413,365 there is described a process for the manufacture of a mixture consisting of 1,2-dichlorobutene-(2), 1,3-dichlorobutene-(2) and 2,3-dichlorobutene-(1) by subjecting 1,2,3-trichlorobutane or a mixture containing 1,2,3-trichlorobutane to dehydrochlorination at a temperature higher than 100° C., which comprises heating 1,2,3-trichlorobutane in contact with between about 0.2 and 35 parts by weight of a trialkyl phosphine or triaryl phosphine or their hydrochlorides or quaternary phosphonium chlorides with 1,2,3-trichlorobutane as the catalyst to a temperature between about 130 and 170° C., preferably between 160 and 167° C., and removing later hydrogen chloride and the dichlorobutene mixture by conventional distillation.

As taught in the above copending application a mixture of 1,2,3-trichlorobutane and 2,2,3,3-tetrachlorobutane is preferably subjected to the dehydrochlorination reaction.

The present invention, which is an improvement in or modification of the process disclosed in the above copending application, relates to an improved process for the continuous manufacture of a mixture consisting substantially of 1,2-dichlorobutene-(2), 1,3-dichlorobutene-(2) and 2,3-dichlorobutene-(1) by the steps comprising dehydrochlorinating 1,2,3-trichlorobutane containing between about 5 and 20% by weight of 2,2,3,3-tetrachlorobutane contaminants not accessible to dehydrochlorination, in contact with between about 0.2 and 35% by weight, calculated on the contaminated trichlorobutane, of a trialkyl or triaryl phosphine or their hydrochlorides or their quaternary phosphonium chlorides formed with 1,2,3-trichlorobutane as the catalyst; subjecting the resulting reaction mixture, consisting of the contaminated trichlorobutane and the catalyst, to reflux-boiling in a reactor having a fractionating column associated therewith; evacuating, cooling and removing near the column head hydrogen chloride gas which is found to have been split off; subjecting vapors, which ascend in the column, to complete condensation until a temperature of about 127° C. (760 mm. mercury) is found to have established in the column head; removing then the resulting dichlorobutene mixture in vapor form at a constant column head temperature of about 127° C. (760 mm. mercury) and condensing it, the said improved process comprising withdrawing the dichlorobutene mixture at a reflux ratio of $R=1$ to 20, preferably of $R=3$ to 10; withdrawing the completely condensed matter or reflux matter near the column base; introducing such matter into a circulation evaporator and recycling it later in vapor form from said evaporator into the reactor; continuously supplying the said circulation evaporator with metered quantities of fresh tetrachlorobutane-containing 1,2,3-trichlorobutane coming from a reservoir, the said tetrachlorobutane-containing 1,2,3-trichlorobutane being supplied at the same rate as produced dichlorobutene mixture is withdrawn from the column; and, once the 1,2,3-trichlorobutane in the reactor is found to contain about 30% by weight tetrachlorobutane, introducing a portion of the reflux matter withdrawn near the column base into a stirrable cooler; centrifuging the 2,2,3,3-tetrachlorobutane, which is found partially to crystallize in the said cooler at a temperature of 0° C. and withdrawing it; and recycling mother liquor to the said circulation evaporator.

The feed material for use in the present process can be obtained by chlorination of butene-(2) with the resultant formation of a mixture comprising 2,2,3- and 1,2,3-trichlorobutanes and minor amounts of 2,2,3,3-tetrachlorobutane. After distillative isolation of 2,2,3-trichlorobutane (B.P.$_{760}$=143° C.), there is obtained 1,2,3-trichlorobutane (B.P.$_{760}$=170° C.) containing between 5 and 20% by weight 2,2,3,3-tetrachlorobutane, which has a boiling point of 167° C. under a pressure of 760 mm. mercury and, therefore, is difficult to separate from 1,2,3-trichlorobutane by distillation. For this reason, the tetrachlorobutane-containing 1,2,3-trichlorobutane is subjected to dehydrochlorination which, however, does not affect the 2,2,3,3-tetrachlorobutane itself under the reaction conditions.

The dichlorobutene mixture of the present invention, which consists substantially of 1,2-dichlorobutene-(2), 1,3-dichlorobutene-(2) and 2,3-dichlorobutene plus very minor proportions of 1,2-dichlorobutene-(3) and 1,3-dichlorobutene-(2) is known to be a feed material which can be dehydrochlorinated further to give 2-chlorobutadiene-(1,3). 2-chlorobutadiene-(1,3) is the principal product obtained on carrying out the pyrolysis, which also entails the formation of very minor proportions of undesirable 1-chlorobutadiene-(1,3).

As taught in the parent specification, the trialkyl phosphines used in the present process are preferably those which contain between 4 and 18 carbon atoms per alkyl group. The following alkyl radicals can be used, for example, as the "alkyl" in the trialkyl phosphines: n-butyl, isobutyl, n-pentyl, n-hexyl, n-heptyl, n-octyl, n-nonyl, n-decyl, n-undecyl, n-dodecyl (lauryl), palmityl, stearyl and further isomeric or homologous alkyls. The trialkyl phosphines can contain up to three different alkyl groups. The triaryl phosphines preferably include triphenyl phosphine, but the various tritolyl or trixylyl phosphines may be used as well. The trialkyl or triaryl phosphines or their hydrochlorides or quaternary phosphonium chlorides act as true catalysts in the process of the present invention, and every catalyst molecule produces the dehydrochlorination of a plurality of 1,2,3-trichlorobutane molecules. The process of the present invention can be carried out by adding to the reaction mixture no more than a suitable tertiary phosphine, the hydrochlorides and quaternary phosphonium chlorides forming automatically in the presence of hydrogen chloride or 1,2,3-trichlorobutane.

The catalyst is preferably used in a proportion between 0.2 and 20% by weight, more preferably between 1 and 5% by weight, referred to the contaminated 1,2,3-trichlorobutane. The reaction mixture is subjected to the dehydrochlorination in the reactor at a temperature, which is a function of the pressure applied (between 0.3 and 3.5 atmospheres absolute) and lies between 130 and 220° C. Preferably, however, the dehydrochlorination is carried out at atmospheric pressure and at a reaction temperature between 160 and 175° C.

In the 1,2,3-trichlorobutane dehydrohalogenation process described in the parent specification, the 2,2,3,3-tetrachlorobutane unaccessible to dehydrochlorination and dissolved in 1,2,3-trichlorobutane is found to be retained in the reactor base together with the catalyst and unreacted 1,2,3-trichlorobutane, given that the process is carried out in discontinuous fashion. The finishing treatment of this residue entails considerable expenditure of apparatus, losses of catalyst and unreacted 1,2,3-trichlorobutane. In the continuous process (cf. parent specification, working Examples 5 and 6), the 2,2,3,3-tetrachlorobutane unaccessible to dehydrochlorination is withdrawn together with produced dichlorobutenes near the head of a distilling column mounted on the top of the reactor. This is done in order to prevent the 2,2,3,3-tetrachlorobutane from accumulating in the reactor base with the result that the dichlorobutenes produced cannot immediately be subjected to further thermal dehydrochlorination into 2-chlorobutadiene-(1,3). In addition, it is necessary in the continuous process that the 2,2,3,3 - tetrachlorobutane (B.P.=167° C.) be removed together with substantially the same quantity of 1,2,3-trichlorobutane (B.P.=170° C.) because of the slight difference of only 3 centigrade degrees of their boiling points, the two compounds being removed near the head of a fractionating column. This quantity of 1,2,3-trichlorobutane is removed either at the price of a lower yield or, after distillative separation from the dichlorobutenes, must be separated further in complicated manner from 2,2,3,3-tetrachlorobutane to be recycled then to the reactor.

In the earlier process, this results in a 1,2,3-trichlorobutane conversion rate of 90 to 95% and in a maximum yield of 94.2%, referred to the conversion rate. In the continuous process using 4% triphenyl phosphine catalyst in the reaction mixture, the space/time yield is found after 200 hours of operation to be 84 grams dichlorobutene mixture per liter of reaction mixture per hour; in the continuous process using 8% triphenyl phosphine catalyst in the reaction mixture, the space/time yield is found after 130 hours of operation to be 130 grams dichlorobutene mixture per liter of reaction mixture per hour (cf. parent specification, working Examples 5 and 6).

As compared therewith, the present process enables the 1,2,3-trichlorobutane conversion rate to be increased to 99% and the yield of dichlorobutenes transformable into 2-chlorobutadiene-(1,3) to be increased to 98%, referred to 1,2,3-trichlorobutane. In addition, the dichlorobutenes produced can be directly transformed, without awaiting finishing treatment, into 2-chlorobutadiene-(1,3) and hydrogen chloride, by pyrolytic dehydrochlorination.

This improvement is produced by means of the apparatus shown diagrammatically in the accompanying drawing.

1,2,3-trichlorobutane containing between about 5 and 15% of dissolved 2,2,3,3-tetrachlorobutane and the catalyst is introduced into reactor 4, heated to boiling and the vapors, which ascend in the reactor, are completely condensed in the head of column 5. Once the head temperature is found to be 127° C., which is maintained constant, the dichlorobutenes produced are withdrawn at a reflux ratio of $R=1$ to 20, preferably of $R=3$ to 10, via coolers 6 and 7 and conveyed to receiver 8. Hydrogen chloride, which is found to have been formed, is removed from cooler 7 and subjected to further treatment. This makes the temperature in the reactor base increase from 160 to 165 to 170° C. Product running back from column 5 is not directly recycled to reactor 4, but is first vaporized in circulation evaporator 3 to be introduced then in vapor form into reactor 4. Fresh feed material coming from reservoir 1 is supplied by means of pump 2 to provide for a constant amount of material in the apparatus. When the 2,2,3,3-tetrachlorobutane content in reactor 4 is found to have increased to 30%, then a portion of reflux matter coming from column 5 is delivered to stirrable cooler 9, in which the 2,2,3,3-tetrachlorobutane partially crystallizes out at 0° C. It is centrifuged in centrifuge 10 and withdrawn. Solution (mother liquor) delivered from centrifuge 10 is collected in container 11 and conveyed by means of pump 12 to circulation evaporator 3. Reflux matter is always withdrawn from column 5 and conveyed to cooler 9 at a rate which ensures that the 2,2,3,3-tetrachlorobutane level remains constant, in reactor 4.

The principal point of distinction between the present and the earlier processes resides in the fact that the 2,2,3,3-tetrachlorobutane unaccessible to dehydrochlorination and dissolved in 1,2,3-trichlorobutane can directly be isolated therefrom by crystallizing it in the cooler, resulting in a 1,2,3-trichlorobutane conversion rate increased to 99% and a yield increased to 98%. The 2,2,3,3-tetrachlorobutane isolated by the process of the present invention is found to contain no more than 5% 1,2,3-trichlorobutane; this corresponds to 0.5 to 0.6% of the trichlorobutane used. In addition, the dichlorobutenes produced by the present process, which are free from significant proportions of 1,2,3-trichlorobutane and 2,2,3,3-tetrachlorobutane, can be directly subjected to thermal dehydrochlorination into 2-chlorobutadiene-(1,3), without awaiting finishing treatment.

For example, the dichlorobutene mixture produced by the earlier continuous process and subjected to gas chromatography is found to have the following composition in percent by weight:

| | |
|---|---|
| 2,3-dichlorobutene-(1) | 13.3 |
| 1,2-dichlorobutene-(2) | 45.0 |
| 1,3-dichlorobutene-(2) | 22.5 |
| 1,2-dichlorobutene-(3) | 1.2 |
| 1,4-dichlorobutene-(2) | 0.9 |
| 2-chlorobutadiene-(1,3) | 0.1 |
| 1-chlorobutadiene-(1,3) | 0.2 |
| 1,2,3-trichlorobutane | 8.1 |
| 2,2,3,3-tetrachlorobutane | 8.7 |

The dichlorobutene mixture produced by the present process, however, will be found to have the following composition in percent by weight:

| | |
|---|---|
| 2,3-dichlorobutene-(1) | 16.2 |
| 1,2-dichlorobutene-(2) | 53.8 |
| 1,3-dichlorobutene-(2) | 27.7 |
| 1,2-dichlorobutene-(3) | 1.5 |
| 1,4-dichlorobutene-(2) | 0.4 |
| 2-chlorobutadiene-(1,3) | 0.1 |
| 1-chlorobutadiene-(1,3) | 0.1 |
| 1,2,3-trichlorobutane | — |
| 2,2,3,3-tetrachlorobutane | 0.2 |

The earlier process has also been found to entail the deposition of material containing considerable proportions of catalyst in the apparatus near places transmitting the energy necessary for dehydrochlorination and vaporization of the dichlorobutenes produced. For this reason, it has previously been necessary repeatedly to discontinue operation and cleanse the apparatus.

The apparatus shown in the accompanying drawing enables the formation of such solid catalyst-containing residues to be substantially obviated as all of the product running back from the column, the freshly supplied feed material and the 1,2,3-trichlorobutane recycled from the 2,2,3,3-tetrachlorobutane separation zone, are vaporized outside the reactor base in a circulation evaporator with no catalyst therein, and conveyed in vapor form to the reactor. The reaction mixture is directly supplied with no more than the energy necessary to achieve the dehydrochlorination and to compensate losses occasioned by heat dissipation. This apparatus can be operated for months without having a residue awaiting removal from the reactor.

The present process has also unexpectedly been found considerably to improve the space/time yield. For example, when carried out over a 200-hour period in contact with 2.5% triphenyl phosphine catalyst, referred to contaminated 1,2,3-trichlorobutane, the present process will be found to produce a space/time yield of dichlorobutene mixture of 107 grams per liter of reaction mixture per hour. As compared therewith, the earlier process carried out over the same period of time in the presence of 4% triphenyl phosphine catalyst in the reaction mixture produces a space/time yield of only 84 grams per liter per hour. The use of 5% triphenyl phosphine in the present process, referred to contaminated trichlorobutane, results in the formation of 198 grams dichlorobutenes per liter per hour, whereas the use in the earlier process of 8% triphenyl phosphine catalyst results in a dichlorobutene yield of at most 130 grams per liter per hour. This improved space/time yield makes it possible to use smaller catalyst quantities or smaller reactors and thereby to reduce the production costs.

The reactor is preferably made up of ceramic material, enamel or glass or tantalum or a nickel-molybdenum alloy.

EXAMPLE 1

100 kg. of a mixture comprising 92.25 kg. 1,2,3-trichlorobutane and 7.75 kg. 2,2,3,3-tetrachlorobutane subjected to the dehydrochlorination process of the present invention while using 2.5 kg. triphenyl phosphine catalyst gave 20.33 kg. hydrogen chloride and 70.61 kg. of a dichlorobutene mixture having the following composition in percent by weight:

| | |
|---|---|
| 2,3-dichlorobutene-(1) | 13.31 |
| 1,2-dichlorobutene-(2) | 52.64 |
| 1,3-dichlorobutene-(2) | 29.18 |
| 1,2-dichlorobutene-(3) | 1.97 |
| 1,4-dichlorobutene-(2) | 1.38 |
| 1-chlorobutadiene-(1,3) | 0.05 |
| 2-chlorobutadiene-(1,3) | 0.05 |
| 1,2,3-trichlorobutane | 0.71 |
| 2,2,3,3-tetrachlorobutane | 0.71 |

A further 7.25 kg. 2,2,3,3-tetrachlorobutane were isolated by crystallization. The isolated 2,2,3,3-tetrachlorobutane was found to contain 1.81 kg. unreacted 1,2,3-trichlorobutane. The 1,2,3-trichlorobutane conversion rate accordingly was 97.5%; dichlorobutenes transformable into 2-chlorobutadiene-(1,3) (these included the first four compounds in the above mixture) were obtained in a yield of 98.6%, referred to the conversion rate. The space/time yield was found to be 107 grams dichlorobutenes per liter reaction mixture per hour.

EXAMPLE 2

100 kg. of a mixture comprising 91.74 kg. 1,2,3-trichlorobutane and 8.26 kg. 2,2,3,3-tetrachlorobutane subjected to the dehydrochlorination process of the present invention while using 5 kg. triphenyl phosphine catalyst gave 20.55 kg. hydrogen chloride and 70.50 kg. of a dichlorobutene mixture having the following composition in percent by weight:

| | |
|---|---|
| 2,3-dichlorobutene-(1) | 16.2 |
| 1,2-dichlorobutene-(2) | 53.8 |
| 1,3-dichlorobutene-(2) | 27.7 |
| 1,2-dichlorobutene-(3) | 1.5 |
| 1,4-dichlorobutene-(2) | 0.4 |
| 1-chlorobutadiene-(1,3) | 0.1 |
| 2-chlorobutadiene-(1,3) | 0.1 |
| 2,2,3,3-tetrachlorobutane | 0.2 |

A further 8.12 kg. 2,2,3,3-tetrachlorobutane were isolated by crystallization. The isolated 2,2,3,3-tetrachlorobutane was found to contain 0.83 kg. unreacted 1,2,3-trichlorobutane. The 1,2,3-trichlorobutane conversion rate accordingly was 99.1%; dichlorobutenes transformable into 2-chlorobutadiene-(1,3) (these included the first four compounds in the above mixture) were obtained in a yield of 99.5%, referred to the conversion rate, or 98.6% referred to the 1,2,3-trichlorobutane used. The space/time yield was found to be 198 grams dichlorobutene mixture per liter reaction mixture per hour.

What is claimed is:

1. In the process for the continuous manufacture of a mixture consisting substantially of 1,2-dichlorobutene-(2), 1,3-dichlorobutene-(2) and 2,3-dichlorobutene-(1) by the steps comprising dehydrochlorinating 1,2,3-trichlorobutane, containing between about 5 and 20% by weight of 2,2,3,3-tetrachlorobutane, contaminants unaccessible to dehydrochlorination, in contact with between about 0.2 and 35% by weight, calculated on the contaminated trichlorobutane, of at least one member selected from the group consisting of a trialkyl and triaryl phosphine, their hydrochlorides or their quaternary phosphonium chlorides formed with 1,2,3-trichlorobutane as the cataylst; subjecting the resulting reaction mixture, consisting of the contaminated trichlorobutane and the catalyst, to reflux-boiling in a recator having a fractionating column associated therewith; evacuating, cooling and removing near the column head hydrogen chloride gas which is found to have been split off; subjecting vapors, which ascend in the column, to complete condensation until a temperature of about 127° C. (760 mm. mercury) is found to have been established in the column head; removing then the resulting dichlorobutene mixture in vapor form at a constant column head temperature of about 127° C. (760 mm. mercury) and condensing it, the improvement which comprises withdrawing the dichlorobutene mixture at a reflux ratio of 1 to 20; withdrawing the completely condensed matter of reflux matter near the column base; introducing such matter into a circulation evaporator and recycling it later in vapor form from said evaporator into the reactor; continuously supplying the said circulation evaporator with metered quantities of fresh tetrachlorobutane-containing 1,2,3-trichlorobutane coming from a reservoir, the said tetrachlorobutane-containing 1,2,3-trichlorobutane being supplied at the same rate as produced dichlorobutene mixture is withdrawn from the column; and, once the 1,2,3-trichlorobutane in the reactor is found to contain about 30% by weight tetrachlorobutane, introducing a portion of reflux matter withdrawn near the column base into a cooler; centrifuging said matter containing the 2,2,3,3-tetrachlorobutane, which is found partially to crystallize in the said cooler at a temperature of 0° C., separating said 2,2,3,3-tetrachlorobutane; and recycling mother liquor to the said circulation evaporator.

2. The process of claim 1, wherein the reflux ratio is 3 to 10.

References Cited

UNITED STATES PATENTS 3,413,365  11/1968  Sennewald et al. ---- 260—654D

BERNARD HELFIN, Primary Examiner

J. A. BOSKA, Assistant Examiner